United States Patent [19]
Yamamoto et al.

[11] Patent Number: 5,854,341
[45] Date of Patent: Dec. 29, 1998

[54] ANTI-FOGGING COATING COMPOSITION, ANTI-FOGGING COATED ARTICLE AND METHOD FOR PRODUCING SAME

[75] Inventors: Tohru Yamamoto; Shigeo Yoshida; Hatsumi Ikari, all of Shiga-ken, Japan

[73] Assignees: Nakato Laboratory, Inc., Shiga-ken; Canon Kabushiki Kaisha, Tokyo, both of Japan

[21] Appl. No.: 569,843

[22] Filed: Dec. 8, 1995

[30] Foreign Application Priority Data

Dec. 8, 1994 [JP] Japan .................................. 6-305210
Nov. 13, 1995 [JP] Japan .................................. 7-294591

[51] Int. Cl.$^6$ .................................................. C08K 3/20
[52] U.S. Cl. ...................... 524/767; 524/379; 524/800; 528/8; 528/9; 528/394; 528/395; 528/398; 528/408; 528/421; 525/403
[58] Field of Search ........................ 528/8, 9, 394, 528/395, 398, 408, 421; 524/767, 379, 800; 525/403

[56] References Cited

U.S. PATENT DOCUMENTS

| | | | |
|---|---|---|---|
| 4,963,626 | 10/1990 | Hirose et al. ........................... | 525/403 |
| 4,983,654 | 1/1991 | Cheung et al. ......................... | 528/398 |
| 5,008,328 | 4/1991 | Nakai et al. ............................. | 524/767 |
| 5,268,198 | 12/1993 | Yamasaki et al. . | |

FOREIGN PATENT DOCUMENTS

B119427 11/1989 Japan .

OTHER PUBLICATIONS

*New Journal of Chemistry*, "Coatings for mechanical and chemical protection based on organic–inorganic sol–gel nanocomposites", vol. 18, No. 10, Oct. 1, 1994, pp. 1117–1123.

*Journal of Non–Crystalline Solids*, "Multifunctional inorganic–organic composite sol–gel costings for glass surfaces", vol. 178, Nov. 3, 1994, pp. 302–312.

*Chemical Abstracts*, Synthesis and properties of inorganic/organic hybrid gels by the sol–gel process, vol. 115, No. 22, Dec. 2, 1991, p. 359.

*Database WPI*, Section Ch, Week 9107, Derwent Publications Ltd., Dec. 27, 1990, Class A82, An 91–047375.

*Database WPI*, Section Ch, Week 8741, Derwent Publications Ltd., Sep. 5, 1987, Class A82, AN 87–288555.

*Primary Examiner*—Melvyn I. Marquis
*Attorney, Agent, or Firm*—Sughrue, Mion, Zinn, Macpeak & Seas, PLLC

[57] ABSTRACT

An anti-fogging coating composition contains (a) an inorganic alkoxide and/or a hydroxyl group-containing polymer formed therefrom by hydrolysis and polycondensation, the inorganic alkoxide being represented by the formula (I):

$$M(OR)_n(X)_{a-n} \qquad (I),$$

wherein M is an inorganic element selected from the group consisting of Si, Al, Ti, Zr, Ca, Fe, V, Sn, Li, Be, B and P; R is an alkyl group; X is an alkyl group with or without functional groups or a halogen atom; a is a number representing the valence of M; and n is an integer from 1 to a; (b) a polyalkylene oxide, a weight ratio of the polyalkylene oxide to the inorganic alkoxide and/or the hydroxyl group-containing polymer being 100/1–100/150; (c) 0.5 parts by weight or less of an acid catalyst per 100 parts by weight of (a); (d) 0.01–1 part by weight of a base catalyst per 100 parts by weight of (a)+(b); (e) 100–5,000 parts by weight of an organic solvent per 100 parts by weight of (a)+(b)+(d); and (f) a stoichiometric amount or more of water for the hydrolysis of the inorganic alkoxide.

23 Claims, No Drawings

ANTI-FOGGING COATING COMPOSITION, ANTI-FOGGING COATED ARTICLE AND METHOD FOR PRODUCING SAME

BACKGROUND OF THE INVENTION

The present invention relates to an anti-fogging coating composition for providing substrates needing fog resistance and dew resistance such as optical lenses, spectacles, window glasses for vehicles and films for ink jet printers with hydrophilic or water-absorbing coatings which are insoluble and have a high surface hardness. The present invention also relates to an anti-fogging coated article produced therefrom and a method for producing the same.

Substrates of glass or plastics are sometimes fogged, because moisture in the air is condensed to fine water droplets on substrate surfaces, causing irregular reflection of light thereon, when their surface temperatures are lowered below their dew points. Accordingly, by suppressing the formation of fine water droplets on the substrate surfaces, it would be possible to prevent their fogging. Examples of fog-preventing methods are (A) adjustment of wettability, (B) provision of water-absorbing properties, (C) provision of water-repelling properties, and (D) adjustment of temperature by heating, etc.

(A) Adjustment of wettability

Anti-fogging sprays are commercially available to decrease contact angles of water droplets to substrate surfaces, but such sprays do not have long-lasting anti-fogging effects because their anti-fogging functions are achieved by surfactants.

(B) Provision of water-absorbing properties

Water-absorbing properties may be obtained by hydrophilic polymer coatings. Their anti-fogging effects last longer than those of the anti-fogging sprays, but fogging takes place and further coats start dissolving if water is absorbed over their water absorption capacity.

(C) Provision of water-repelling properties

Water-repelling properties may be obtained by applying water-repelling compounds to substrates. Particularly when water-repelling compounds are applied to inner surfaces of plastic films of green houses, fine water droplets come to contact with each other to grow larger and flow down along the film surfaces, thereby exerting anti-fogging effects. However, fine water droplets rather stick to the film surfaces, rather aggravating fogging in some cases.

(D) Adjustment of temperature by heating

The adjustment of temperature by heating is effective for lenses of copying machines, rear windows of automobiles, mirrors of dressers, etc. However, the application of this method is restricted because it needs a power supply.

To overcome the disadvantages of the above conventional methods, attempts have been made to provide water-resistant anti-fogging coats made of organic polymers such as polyether polyols and surfactants. Coats formed from such anti-fogging coating compositions have hydrophilic properties by the function of polyether polyols in the presence of surfactants, absorbing water and thereby exerting anti-fogging properties. When water is absorbed over the limits of the coats, the surfactants function to control the wetting of the coat surfaces, thereby keeping transparency thereof. However, Since the surfactants are easily dissolved in water and washed away, the anti-fogging properties of the coats rapidly decrease. In addition, the anti-fogging coats are likely to have rapidly decreasing strength.

OBJECTS AND SUMMARY OF THE INVENTION

Accordingly, an object of the present invention is to provide an anti-fogging coating composition capable of forming an anti-fogging coat with excellent hydrophilic properties and water absorption as well as excellent surface hardness.

Another object of the present invention is to provide an anti-fogging coat formed from such an anti-fogging coating composition.

A further object of the present invention is to provide a method for producing an anti-fogging coated article from such an anti-fogging coating composition.

As a result of research in view of the above objects, it has been found that by providing a hydrophilic polymer coating with a hybrid structure in which inorganic skeletons are cross-linked with organic molecules, excellent anti-fogging properties and surface hardness can be achieved in the resultant anti-fogging coat while keeping insolubility.

Thus, the anti-fogging coating composition according to the present invention comprises at least one material selected from the group consisting of inorganic alkoxides and hydroxyl group-containing polymers formed from the inorganic alkoxides by hydrolysis and polycondensation; a polyalkylene oxide; a catalyst; and a mixture of an organic solvent and water.

The anti-fogging coated article according to the present invention comprises a substrate and an anti-fogging coat formed on at least one surface of the substrate, the anti-fogging coat being made of the above anti-fogging coating composition.

The method for producing the anti-fogging coated article according to the present invention comprises the steps of (i) applying the above anti-fogging coating composition to at least one surface of the substrate; and (ii) subjecting the resultant coated layer to a heat treatment at a temperature of 80° C. or higher.

DETAILED DESCRIPTION OF THE PREFERRED EMBODIMENTS

[1] Anti-fogging coating composition

The anti-fogging coating composition comprises an inorganic alkoxide and/or a hydroxyl group-containing polymer formed therefrom by hydrolysis and polycondensation; a polyalkylene oxide; a catalyst; and a mixture of an organic solvent and water.

[A] Inorganic alkoxides and/or hydroxyl group-containing polymers (a) Inorganic alkoxides.

(1) General

The inorganic alkoxide used in the present invention may preferably be at least one compound represented by the general formula (I):

$$M(OR)_n(X)_{a-n} \qquad (I),$$

wherein M is an inorganic element selected from the group consisting of Si, Al, Ti, Zr, Ca, Fe, V, Sn, Li, Be, B and P; R is an alkyl group; X is an alkyl group with or without functional groups or a halogen atom; a is a number representing the valence of M; and n is an integer from 1 to a.

(2) $M(OR)_a$

Commonly used among the compounds represented by the general formula (I) are those having only alkoxyl groups bonded to M, namely n=a.

(i) Alkoxysilanes

When M is Si, the number "a" is 4. Such alkoxides may be called alkoxysilanes represented by $Si(OR^1)_4$, wherein $R^1$ is an alkyl group having preferably 1–4 carbon atoms (hereinafter referred to as "lower alkyl group"). Examples of such alkoxysilanes include $Si(OCH_3)_4$, $Si(OC_2H_5)_4$, $Si(O\text{-iso-}C_3H_7)_4$, $Si(O\text{-n-}C_4H_9)_4$, $Si(O\text{-t-}C_4H_9)_4$, etc. These alkoxysilanes may be used alone in combination.

(ii) Aluminum alkoxides

When M is Al, the number "a" is 3. Such alkoxides may be represented by $Al(OR^2)_3$, wherein $R^2$ is preferably a lower alkyl group. Examples of such aluminum alkoxides include $Al(OCH_3)_3$, $Al(OC_2H_5)_3$, $Al(O\text{-n-}C_3H_7)_3$, $Al(O\text{-iso-}C_3H_7)_3$, $Al(O\text{-n-}C_4H_9)_3$, $Al(O\text{-t-}C_4H_9)_3$, etc. These aluminum alkoxides may be used alone or in combination. Such aluminum alkoxides are usually mixed with alkoxysilanes. By using the aluminum alkoxides, the resultant anti-fogging coat has improved transparency and heat resistance.

The amount of the aluminum alkoxide is preferably 10 parts by weight or less, particularly about 5 parts by weight per 100 parts by weight of the alkoxysilane. If the amount of the aluminum alkoxide is more than 10 parts by weight, the resultant polymer is likely to be subjected to gelation, thereby providing cracks in the resultant anti-fogging coat.

(iii) Titanium alkoxides

When M is Ti, the number "a" is 4. Such alkoxides may be represented by $Ti(OR^3)_4$, wherein $R^3$ is preferably a lower alkyl group. Examples of such titanium alkoxides include $Ti(OCH_3)_4$, $Ti(OC_2H_5)_4$, $Ti(O\text{-n-}C_3H_7)_4$, $Ti(O\text{-iso-}C_3H_7)_4$, $Ti(O\text{-n-}C_4H_9)_4$, $Ti(O\text{-t-}C_4H_9)_4$, etc. These titanium alkoxides may be used alone or in combination. Such titanium alkoxides are usually mixed with alkoxysilanes. By using the titanium alkoxides, the resultant anti-fogging coat has improved ultraviolet resistance and the substrate also is provide with improved heat resistance.

The amount of the titanium alkoxide is preferably 3 parts by weight or less, particularly about 1 part by weight per 100 parts by weight of the alkoxysilane. If the amount of the titanium alkoxide is more than 3 parts by weight, the resultant polymer is likely to be brittle, whereby the anti-fogging coat formed on the substrate easily peels off.

(iv) Zirconium alkoxides

When M is Zr, the number "a" is 4. Such alkoxides may be represented by $Zr(OR^4)_4$, wherein $R^4$ is preferably a lower alkyl group. Examples of such zirconium alkoxides include $Zr(OCH_3)_4$, $Zr(OC_2H_5)_4$, $Zr(O\text{-n-}C_3H_7)_4$, $Zr(O\text{-iso-}C_3H_7)_4$, $Zr(O\text{-n-}C_4H_9)_4$, $Zr(O\text{-t-}C_4H_9)_4$, etc. These zirconium alkoxides may be used alone or in combination. Such zirconium alkoxides are usually mixed with alkoxysilanes. By using the zirconium alkoxides, the resultant anti-fogging coat has improved toughness and heat resistance.

The amount of the zirconium alkoxide is preferably 5 parts by weight or less, particularly about 3 parts by weight per 100 parts by weight of the alkoxysilane. If the amount of the zirconium alkoxide is more than 5 parts by weight, the resultant polymer is likely to be subjected to gelation and become brittle, whereby the anti-fogging coat formed on the substrate easily peels off.

(v) Other alkoxides

The other alkoxides than those described above may be $Ca(OC_2H_5)_2$, $Fe_2(OC_2H_5)_3$, $V(O\text{-iso-}C_3H_7)_4$, $Sn(O\text{-t-}C_4H_9)_4$, $Li(OC_2H_5)$, $Be(OC_2H_5)_2$, $B(OC_2H_5)_3$, $P(OCH_3)_3$, $P(OC_2H_5)_3$, etc. The total amount of these alkoxides is preferably 5 parts by weight or less per 100 parts by weight of the alkoxysilane.

(3) $M(OR)_n(X)_{a-n}$ ($n \leq a-1$)

In the inorganic alkoxides in which M is bonded to X in addition to alkoxyl groups ($n \leq a-1$), X is preferably a halogen atom such as Cl and Br. In the case where X is a halogen atom, X is converted to an OH group by hydrolysis like the alkoxyl groups, causing a polycondensation reaction as discussed in detail later.

X may also be an alkyl group preferably having 1–15 carbon atoms with or without a functional group. The functional group is not subjected to hydrolysis, remaining in the resultant polymer as organic portions. Preferred examples of such functional groups include carbonyl groups, carboxyl groups, amino groups, vinyl groups and epoxy groups. These functional groups are preferable to improve the anti-fogging properties of the coatings.

Examples of the inorganic alkoxides of the formula (I) having X include vinyltrichlorosilane, vinyltrimethoxysilane, vinyltriethoxysilane, γ-methacryloxypropyltrimethoxysilane, γ-glycidoxypropyltrimethoxysilane, γ-aminopropylmethoxysilane, etc.

In the case of containing X, the amounts of the inorganic alkoxides may the same as described in (2) (i)–(iv) above.

(b) Hydroxyl group-containing polymers

Instead of adding the inorganic alkoxide itself or together therewith, it is possible to add a hydrolyzate of the inorganic alkoxide. The hydrolyzate of the inorganic alkoxide is a hydroxyl group-containing polymer formed therefrom by hydrolysis and polycondensation in the presence of water and an acid catalyst. The hydrolyzate of an inorganic alkoxide may be an oligomer having a relatively low molecular weight, for instance, a polymerization degree of 3–50. The hydrolysis and polycondensation reaction of the inorganic alkoxide may generally be carried out at a temperature between room temperature and 50° C. for 1 minute to 2 hours. Of course, a mixture of the inorganic alkoxide and the hydroxyl group-containing polymer may be used

[B] Polyalkylene oxide

The polyalkylene oxide used in the present invention may be polyethylene oxide, polypropylene oxide, polypropylene glycol, etc. Most preferable among them is polyethylene oxide. The polyalkylene oxide has a weight-average molecular weight of preferably 30,000–1,500,000, more preferably 500,000–750,000.

The weight ratio of the polyalkylene oxide to the inorganic alkoxide and/or the hydroxyl group-containing polymer is preferably 100/1–100/150, more preferably 100/5–100/100. If the weight ratio is less than 100/150, sufficient hydrophilic properties cannot be achieved. On the other hand, if the weight ratio exceeds 100/1, the surface hardness and durability of the resulting anti-fogging coat would become insufficient.

[C] Catalyst

The catalysts used in the present invention may be acid catalysts and base catalysts.

(a) Acid catalyst

The acid catalyst is used for the hydrolysis reaction of the inorganic alkoxide. Accordingly, when a hydroxyl group-containing polymer formed from the inorganic alkoxide by partial hydrolysis and polycondensation is contained, the acid catalyst may be omitted.

The preferable examples of the acid catalysts are mineral acids such as hydrochloric acid, sulfuric acid, nitric acid, a hydrochloride gas etc.

Organic acids and their anhydrides may also be used. Examples thereof include tartaric acid, phthalic acid, maleic acid, dodecylsuccinic acid, hexahydrophthalic acid, methyl endic acid, pyromellitic acid, benzophenonetetracarboxylic acid, dichlorosuccinic acid, chlorendic acid, phthalic anhydride, maleic anhydride, dodecylsuccinic anhydride, hexahydrophthalic anhydride, methyl endic anhydride, pyromellitic anhydride, benzophenonetetracarboxylic anhydride, dichlorosuccinic anhydride, chlorendic anhydride, etc.

The amount of the acid catalyst is preferably 0.5 parts by weight or less, more preferably 0.01–0.5 parts by weight, most preferably 0.015–0.3 parts by weight per 100 parts by weight of the inorganic alkoxide. If the amount of the acid catalyst is less than 0.01 parts by weight, sufficient hydrolysis does not take place. On the other hand, if the amount of the acid catalyst exceeds 0.5 parts by weight, the polycondensation reaction proceeds excessively, making the viscosity of the composition too high.

(b) Base catalyst

The base catalyst is used mainly for the polycondensation reaction of a hydrolyzate of the inorganic alkoxide, and also for the cross-linking reaction of polyalkylene oxide and for the polycondensation and/or cross-linking reaction of the above hydroxyl group-containing polymer and polyalkylene oxide. Such base catalysts are preferably tertiary amines substantially insoluble in water and soluble in organic solvents. The preferred base catalysts are N,N-dimethylbenzylamine, tripropylamine, tributylamine, tripentylamine, etc., and N-dimethylbenzylamine is particularly preferable.

The amount of the base catalyst is preferably 0.01–1 part by weight, particularly 0.05 parts by weight per 100 parts by weight of the total of the above inorganic alkoxide, the above hydroxyl group-containing polymer if any and polyalkylene oxide. If the amount of the base catalyst exceeds 1 part by weight, the polycondensation reaction proceeds excessively, making the resultant polymer less soluble in an organic solvent, resulting in an anti-fogging coat with non-uniformity and decreased strength.

[D] Mixture of an organic solvent and water

The organic solvents used in the present invention, which should be compatible with water, are methyl alcohol, ethyl alcohol, isopropyl alcohol, butyl alcohol, etc. The organic solvent is used together with water. The amount of the organic solvent is preferably 100–5,000 parts by weight, particularly about 3,000 parts by weight per 100 parts by weight of the total of the above inorganic alkoxide, the above hydroxyl group-containing polymer if any, polyalkylene oxide and the base catalyst. Also, a stoichiometric amount or more of water is added for hydrolysis, and preferably water is 15–50 parts by weight per 100 parts by weight of the above inorganic alkoxide.

[E] Other components

The anti-fogging coating composition of the present invention may further contain at least one polyacrylic acid or its derivative. Examples of polyacrylic acid or its derivative include polyacrylic acid, polymethacrylic acid, salts thereof, etc. The amount of polyacrylic acid or its derivative is preferably 0.1–10 parts by weight per 100 parts by weight of the anti-fogging coating composition. If the amount of polyacrylic acid or its derivative is less than 0.1 parts by weight, the coating composition does not have a high water absorption speed. On the other hand, if the amount of polyacrylic acid or its derivative exceeds 10 parts by weight, the anti-fogging coating composition becomes tacky. When the anti-fogging coating composition is applied to lenses, the amount of polyacrylic acid or its derivative is preferably 0.1–0.5 parts by weight per 100 parts by weight of the anti-fogging coating composition. If the amount of polyacrylic acid or its derivative exceeds 0.5 parts by weight, the resultant anti-fogging coat is not likely to have high hardness.

[2] Anti-fogging coated article

[A] Substrate

The substrates used in the present invention may be glass or plastic products such as optical lenses, spectacles, window glasses, plastic films for ink jet printers, etc.

[B] Method of production (a) Application of anti-fogging coating composition

The above-described components are mixed to prepare an anti-fogging coating composition as a transparent or translucent liquid. The resultant anti-fogging coating composition is applied to at least one surface of the above substrate. The application of the anti-fogging coating composition may be conducted by any know methods such as a spraying method, an immersion method, a brushing method, a roll-coating method, etc.

(b) Heat treatment

The applied substrate may be dried and heated at a temperature of 80° C. or higher, preferably 120°–200° C. to provide an anti-fogging coated article. If necessary, the heat treatment may be conducted repeatedly after each application cycle of the anti-fogging coating composition. The heat treatment time may be 5 minutes to 1 hour.

[C] Anti-fogging coat

The thickness of the finished anti-fogging coat is preferably 0.01–1 $\mu$m, particularly about 0.1 $\mu$m in the case of optical lenses. Further, in the case of window glasses, etc., the thinness of the anti-fogging coat is preferably 1–3 $\mu$m, particularly about 1 $\mu$m. The thickness of the anti-fogging coat may be properly controlled by increasing the thickness of the anti-fogging coating composition applied or repeating the application of the anti-fogging coating composition.

The resultant anti-fogging coat provides anti-fogging and anti-dewing properties to the substrate. The anti-fogging coat is insoluble in water and organic solvents, showing high surface hardness.

[D] Mechanism

In the anti-fogging coating composition of the present invention, the inorganic alkoxide is hydrolyzed by the function of the acid catalyst so that the alkoxyl groups (OR) and halogen atom (X) are converted to OH groups. Further, the base catalyst acts to remove protons from the OH groups, resulting in the polycondensation of a hydrolyzate of the inorganic alkoxide, which in turn produces a polymer or oligomer having OH groups. At the same time, the OH groups of polyalkylene oxide reacts with the hydrolyzate of the inorganic alkoxide and the polymer or oligomer having OH groups by the action of the base catalyst, thereby producing a composite polymer having inorganic portions composed of M in the formula (1) such as Si and organic portions derived from polyalkylene oxide. These hydrolysis and polycondensation reactions partially proceed when each component is mixed. Accordingly, the anti-fogging coating composition is a dispersion of colloidal sol, which is a mixture of the inorganic alkoxide and/or a hydrolyzate thereof, a polymer or oligomer derived from the hydrolyzate by polycondensation, polyalkylene oxide, a polycondensation or cross-linking reaction product of alkoxide hydrolyzate and the polyalkylene oxide. Some functional groups represented by X in the formula (I) may participate in the above reactions. For instance, in case where X is a group containing an epoxy group, the epoxy group is opened by the function of the base catalyst to form an OH group, further proceeding reactions with the inorganic alkoxide and the polyalkylene oxide. In case where X is a group having a vinyl group, the vinyl group may be bonded to reactive monomers.

By heat treatment at 80° C. or higher after application and drying of the anti-fogging coating composition, the above polycondensation and cross-linking reaction proceed to form a composite polymer with a three-dimensional network structure. The composite polymer has inorganic portions and organic portions. Specifically, because of the inorganic portions which constitute insoluble skeletons, a coat produced from this polymer is insoluble in water and organic solvents, showing high surface hardness. Also, because of the organic portions which are derived from polyalkylene oxide, a coat produced from this polymer has water-absorbing, hydrophilic portions. Further, in the case where the X group in the formula (I) has a carbonyl group, a carboxyl group, an amino group, a vinyl group, an epoxy group, etc., water is also attracted to these groups.

When polyacrylic acid or its derivative is contained, the anti-fogging coating composition has improved water-absorbing properties, contributing to further improvement of the anti-fogging properties of the resultant coat.

The present invention is described in further detail referring to the following Examples without intention of restricting the scope of the present invention. The percentages in Examples and Comparative Examples are expressed by weight unless otherwise described.

EXAMPLE 1

9.74 g of ethylsilicate $(Si(OC_2H_5)_4)$ was dissolved in 99.3 ml of methanol, and the resultant solution was mixed with 0.002 mol of hydrochloric acid as a acid catalyst and 2 mol of water per 1 mol of ethylsilicate to cause a hydrolysis reaction at 25° C. for 30 minutes . The resultant ethylsilicate hydrolyzate was an oligomer having OH groups at ends. After a solution of 3% (as $SiO_2$) of the ethylsilicate hydrolyzate in methanol was mixed with methanol, N,N-dimethylbenzylamine and a solution of 5% polyethylene oxide having a weight-average molecular weight of 500,000 in methanol were added according to the formulation shown in Table 1. The resultant mixture was stirred at 25° C. for 30 minutes to prepare an anti-fogging coating composition solution which was slightly cloudy.

TABLE I

| Formulation | Amount** |
| --- | --- |
| Solution of ethylsilicate hydrolyzate in methanol* | 90.90 |
| N,N-dimethylbenzylamine | 0.01 |
| Solution of 5% polyethylene oxide in methanol | 9.09 |
| Total | 100.00 |

Note *Concentration = 3% as $SiO_2$.
**Parts by weight.

The anti-fogging coating composition solution was applied to one surface of a glass plate and heat-dried at 150° C. for 10 minutes to provide a transparent coating layer having a thickness of about 0.2 µm. The above steps of application and heat treatment were repeated again in the same manner to form an anti-fogging coating having a thickness of 0.4 µm. The coated glass plate was stored in a refrigerator at about 0° C. for 5 minutes, and then left to stand in an atmosphere at a temperature of 25° C. and at a relative humidity of 81%. As a result, it was observed that the coated surface of the glass plate was not fogged at all.

Comparative Example 1

The same test as in Example 1 was repeated except for not forming an anti-fogging coat on a glass plate surface. As a result, it was observed that the surface of the glass plate was fogged immediately, and that fogging did not disappear until it passed 5 minutes.

EXAMPLE 2

According to the formulation shown in Table 2, a solution of ethylsilicate in methanol (concentration: 28% as $SiO_2$), a solution of aluminum isopropoxide in methanol (concentration: 5% as $Al_2O_3$), 2N hydrochloric acid, water, and N,N-dimethylbenzylamine were mixed and stirred at 25° C. for 15 minutes, and a solution of 5% polyethylene oxide having a weight-average molecular weight of 500,000 in methanol and polypropylene glycol having a weight-average molecular weight of 3,000 were added and stirred at 25° C. for 30 minutes. The resultant anti-fogging coating composition solution was transparent.

TABLE 2

| Formulation | Amount[1] |
| --- | --- |
| Solution of ethylsilicate hydrolyzate in methanol[2] | 8.90 |
| Solution of aluminum isopropoxide in methanol[3] | 0.15 |
| Methanol | 74.00 |
| N,N-dimethylbenzylamine | 0.01 |
| 2N hydrochloric acid | 0.22 |
| Water | 2.93 |
| Solution of 5% polyethylene oxide in methanol | 8.62 |
| polypropylene glycol | 5.17 |
| Total | 100.00 |

Note [1]Parts by weight.
[2]Concentration = 28% as $SiO_2$.
[3]Concentration = 5% as $Al_2O_3$.

The anti-fogging coating composition solution was applied to one surface of a glass plate and dried two times in the same manner as in Example 1. The resultant anti-fogging coat was transparent and as thick as 1 µm.

The coated glass plate was tested in the same manner as in Example 1. As a result, it was observed that the coated surface of the glass plate was not fogged or dewed at all. Even after further storing it in a refrigerator for 2 hours, fogging and dewing were not observed at all.

EXAMPLE 3

According to the formulation shown in Table 3, a solution of 10% polyethylene oxide having a weight-average molecular weight of 300,000 in methanol was mixed with a solution of 5% polyacrylic acid in methanol, N,N-dimethylbenzylamine and γ-glycidoxypropyltrimethoxysilane and stirred at 25° C. for 10 minutes. Thereafter, a solution of a hydrolyzate of aluminum isopropoxide in methanol (concentration: 5% as $Al_2O_3$) was added and stirred at 25° C. for 30 minutes. The resultant anti-fogging coating composition solution was transparent and more viscous than that of Example 1.

TABLE 3

| Formulation | Amount[1] |
| --- | --- |
| Solution of 10% polyethylene oxide in methanol | 81.52 |
| Solution of 5% polyacrylic acid in methanol | 0.26 |
| N,N-dimethylbenzylamine | 0.01 |
| γ-glycidoxypropyltrimethoxysilane | 13.59 |
| Solution of aluminum isopropoxide in methanol[2] | 4.62 |
| Total | 100.00 |

Note [1]Parts by weight.
[2]Concentration = 5% as $Al_2O_3$.

The anti-fogging coating composition solution was applied to one surface of a glass plate and dried in the same manner as in Example 1. The resultant anti-fogging coat was transparent and as thick as 3.0 µm.

The coated glass plate was tested in the same manner as in Example 1. As a result, it was observed that the coated surface of the glass plate was not fogged or dewed at all. After further storing it in a refrigerator for 2 hours, fogging and dewing were not observed at all. The same test as in Example 1 was repeated after drying the tested coated glass plate with a drier. Again, no fogging and dewing were observed at all. The coated glass plate was stored in a refrigerator for 2 hours again to repeat the same test. This time too, no fogging and dewing were observed at all.

The coated glass plate was measured with respect to a surface hardness under a load of 500 g according to JIS K 5400. The evaluation of its surface hardness was "H".

EXAMPLE 4

According to the formulation shown in Table 4, an aqueous solution of 25% polyacrylic acid which was 100% neutralized by N,N-dimethylbenzylamine and an aqueous solution of 10% lithium hydroxide was mixed with a solution of 10% polyethylene oxide having a weight-average molecular weight of 500,000 in methanol and stirred at 25° C. for 5 minutes. While stirring, a solution of a hydrolyzate of ethylsilicate (concentration: 3% as SiO$_2$) was added little by little and stirred at 25° C. for 30 minutes. The resultant anti-fogging coating composition solution was transparent and viscous.

TABLE 4

| Formulation | Amount[1] |
| --- | --- |
| Solution of 10% polyethylene oxide in methanol[2] | 71.84 |
| Aqueous solution of 25% polyacrylic acid | 5.75 |
| N,N-dimethylbenzylamine | 1.28 |
| Aqueous solution of 10% lithium hydroxide | 1.97 |
| Solution of ethylsilicate hydrolyzate in methanol[3] | 19.16 |
| Total | 100.00 |

Note [1]Parts by weight.
[2]Weight-average molecular weight = 500,000.
[3]Concentration = 3% as SiO$_2$.

The anti-fogging coating composition solution was applied to a polyethylene terephthalate film having a thickness of 100 μm and dried at 150° C. for 5 minutes. As a result, a coated film with a transparent anti-fogging coat having a thickness of 10 μm was obtained without any warp.

Color printing was conducted by a bubble jet-type ink jet printer (Pixel Jet available from Canon) using the above coated film. The bubble jet ink was well absorbed in the coated film without reverse flow of the ink immediately after the start of printing. No tack was appreciated on a coated surface of the film, and the printed film was free from warp and blurring of color ink dots even after the lapse of time. Since this coated film is insoluble in water and organic solvents and well absorbs printed ink, it is suitable as an OHP film.

As described in detail above, the anti-fogging coating composition of the present invention can form an anti-fogging coat which has hydrophilic and water absorption properties and high surface hardness without vulnerability to water and organic solvents on various substrates made of glass, plastics, etc., for instance on optical lenses, spectacles, window glasses for vehicles and films for ink jet printers which need anti-fogging properties and anti-dewing properties. Particularly, by applying the anti-fogging coating composition of the present invention to at least one surface of an OHP film for bubble jet printers to form a high-water absorption coating layer, the OHP film can absorb printed ink rapidly without suffering from reverse flow of ink and warp by the lapse of time, while keeping its surface hardness and insolubility.

What is claimed is:

1. An anti-fogging coating composition comprising
   (a) at least one inorganic alkoxide and/or at least one hydroxyl group-containing polymer formed from said at least one inorganic alkoxide by hydrolysis and polycondensation, said at least one inorganic alkoxide being represented by the general formula (I):

   $$M(OR)_n(X)_{a-n} \quad (I),$$

wherein M is an inorganic element selected from the group consisting of Si, Al, Ti, Zr, Ca, Fe, V, Sn, Li, Be, B and P; R is an alkyl group: X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;
   (b) a polyalkylene oxide;
   (c) a basic catalyst;
   (d) at least one of polyacrylic acid or a derivative thereof; and
   (e) a mixture of a water compatible organic solvent and water.

2. The anti-fogging coating composition according to claim 1, wherein said alkoxide is at least one selected from the group consisting of Si(OC$_2$H$_5$)$_4$, Al(O-iso-C$_3$H$_7$)$_3$, Ti(O-iso-C$_3$H$_7$)$_4$, Zr(O-t-C$_4$H$_9$)$_4$, Zr(O-n-C$_4$H$_9$)$_4$, Ca(OC$_2$H$_5$)$_2$, Fe$_2$(OC$_2$H$_5$)$_3$, V(O-iso-C$_3$H$_7$)$_4$, Sn(O-t-C$_4$H$_9$)$_4$, Li(OC$_2$H$_5$), Be(OC$_2$H$_5$)$_2$, B(OC$_2$H$_5$)$_3$, P(OCH$_3$)$_3$ and P(OC$_2$H$_5$)$_3$.

3. The anti-fogging coating composition according to claim 1, wherein said polyalkylene oxide is polyethylene oxide.

4. The anti-fogging coating composition according to claim 1, wherein said basic catalyst is N,N-dimethylbenzylamine.

5. The anti-fogging coating composition according to claim 1, further comprising at least one polyacrylic acid or its derivative.

6. The anti-fogging coating composition according to claim 5, wherein said polyacrylic acid or its derivative is at least one selected from the group consisting of polyacrylic acid, polymethacrylic acid and salts thereof.

7. An anti-fogging coated article comprising a substrate and an anti-fogging coat formed on at least one surface of said substrate, said anti-fogging coat being made of an anti-fogging coating composition comprising:
   (a) at least one inorganic alkoxide and/or at least one hydroxyl group-containing polymer formed from said at least one inorganic alkoxide by hydrolysis and polycondensation, said at least one inorganic alkoxide being represented by the general formula (I):

   $$M(OR)_n(X)_{a-n} \quad (I),$$

wherein M is an inorganic element selected from the group consisting of Si, Al, Ti, Zr, Ca, Fe, V, Sn, Li, Be, B and P; R is an alkyl group: X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;
   (b) a polyalkylene oxide;
   (c) a basic catalyst;

(d) at least one of polyacrylic acid or a derivative thereof; and (e) a mixture of a water compatible organic solvent and water.

8. The anti-fogging coated article according to claim 7, wherein said substrate is made of glass or plastic.

9. A method for producing an anti-fogging coated article comprising a substrate and an anti-fogging coat formed on at least one side of said substrate, said method comprising the steps of:

(i) applying an anti-fogging coating composition on at least one surface of said substrate, said anti-fogging coating composition comprising:

(a) at least one inorganic alkoxide and/or at least one hydroxyl group-containing polymer formed from said at least one inorganic alkoxides by hydrolysis and polycondensation, said at least one inorganic alkoxide being represented by the general formula (I):

$M(OR)_n(X)_{a-n}$ (I), wherein M is an inorganic element selected from the group consisting of Si, Al, Ti, Zr, Ca, Fe, V, Sn, Li, Be, B and P; R is an alkyl group: X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;

(b) a polyalkylene oxide;

(c) a basic catalyst;

(d) at least one of polyacrylic acid or a derivative thereof; and (e) a mixture of a water compatible organic solvent; and (ii) subjecting the resultant coated layer to a heat treatment at a temperature of 80° C. or higher.

10. The method according to claim 9, wherein said basic catalyst functions as a catalyst in the polycondensation of a hydrolyzate of said inorganic alkoxide, in the cross-linking reaction of said polyalkylene oxide, or in the polycondensation and/or cross-linking reaction of said hydrolyzate, said hydroxyl group-containing polymer and said polyalkylene oxide.

11. An anti-fogging coating composition consisting essentially of (a) at least one inorganic alkoxide represented by the formula (I):

$M(OR)_n(X)_{a-n}$ (I), wherein M is an inorganic element selected from the group consisting of Si, Al, Ti, Zr, Ca, Fe, V, Sn, Li, Be, B and P; R is an alkyl group; X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;

(b) a polyalkylene oxide, a weight ratio of said polyalkylene oxide to said at least one inorganic alkoxide being 100/1–100/150;

(c) 0.01–0.5 parts by weight or less of at least one acid catalyst per 100 parts by of (a);

(d) 0.01–1 part by weight of at least one basic catalyst per 100 parts by weight of (a)+(b);

(e) 0.1–10 parts by weight of at least one polyacrylic acid or its derivative per 100 parts by weight of said anti-fogging coating composition;

(f) 100–5,000 parts by weight of a water compatible organic solvent per 100 parts by weight of (a)+(b)+(d); and (g) a stoichiometric amount or more of water for the hydrolysis of said at least one inorganic alkoxide.

12. An anti-fogging coating composition consisting essentially of (a) at least one hydroxyl group-containing polymer formed from at least one inorganic alkoxide by hydrolysis and polycondensation, said at least one inorganic alkoxide being represented by the formula (I):

$M(OR)_n(X)_{a-n}$ (I), wherein M is an inorganic element selected from the group consisting of Si, Al, Ti, Zr, Ca, Fe, V, Sn, Li, Be, B and P; R is an alkyl group; X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;

(b) a polyalkylene oxide, a weight ratio of said polyalkylene oxide to said at least one hydroxyl group-containing polymer being 100/1–100/150;

(c) 0.01–1 part by weight of at least one basic catalyst per 100 parts by weight of (a)+(b);

(d) 0.1–10 parts by weight of at least one polyacrylic acid or its derivative per 10 parts by weight of said anti-fogging coating composition;

(e) 100–5,000 parts by weight of a water-compatible organic solvent per 100 parts by weight of (a)+(b)+(c); and (f) water.

13. An anti-fogging coating composition consisting essentially of (a) at least one inorganic alkoxide represented by the formula (I):

$M(OR)_n(X)_{a-n}$ (I), wherein M is an inorganic element selected from the group consisting of Si, Al, Ti, Zr, Ca, Fe, V, Sn, Li, Be, B and P; R is an alkyl group; X is an alkyl group with at least one functional group selected from the group consisting of a carbonyl group, a carboxyl group, an amino group, a vinyl group and an epoxy group, or a halogen atom; a is a number representing a valence of M; and n is an integer from 1 to a;

(b) at least one hydroxyl group-containing polymer being formed from said at least one inorganic alkoxide by hydrolysis and polycondensation;

(c) a polyalkylene oxide, a weight ratio of said polyalkylene oxide to said at least one inorganic alkoxide and said at said at least one hydroxyl group-containing polymer being 100/1–100/150;

(d) 0.01–0.5 parts by weight of at least one acid catalyst per 100 parts by of (a);

(e) 0.01–1 part by weight of at least one basic catalyst per 100 parts by weight of (a)+(b)+(c);

(f) 0.1–10 parts by weight of at least one polyacrylic acid or its derivative pe 100 parts by weight of said anti-fogging coating composition;

(g) 100–5,000 parts by weight of a water-compatible organic solvent per 100 parts by weight of (a)+(b)+(c)+(e); and (h) a stoichiometric amount or more of water for the hydrolysis of said at least one inorganic alkoxide.

14. The anti-fogging coating composition according to claim 1, wherein said basic catalyst is a tertiary amine.

15. The anti-fogging coating composition according to claim 1, further comprising at least one acid catalyst selected from the group consisting of mineral acids and anhydrides thereof.

16. The anti-fogging coating composition according to claim 7, wherein said basic catalyst is a tertiary amine.

17. The anti-fogging coating composition according to claim 9, wherein said basic catalyst is a tertiary amine.

18. The anti-fogging coating composition according to claim 11, wherein said basic catalyst is a tertiary amine.

19. The anti-fogging coating composition according to claim 11, further comprising at least one polyacrylic acid or its derivative in an amount of 0.1–10 parts by weight per 100 parts by weight of said anti-fogging coating composition.

20. The anti-fogging coating composition according to claim 12, wherein said basic catalyst is a tertiary amine.

21. The anti-fogging coating composition according to claim 12, further comprising at least one polyacrylic acid or its derivative in an amount of 0.1–10 parts by weight per 100 parts by weight of said anti-fogging coating composition.

22. The anti-fogging coating composition according to claim 13, wherein said basic catalyst is a tertiary amine.

23. The anti-fogging coating composition according to claim 13, further comprising at least one polyacrylic acid or its derivative in an amount of 0.1–10 parts by weight per 100 parts by weight of said anti-fogging coating composition.

* * * * *